(12) United States Patent
Akaba et al.

(10) Patent No.: US 12,565,272 B2
(45) Date of Patent: Mar. 3, 2026

(54) REAR PART STRUCTURE OF VEHICLE BODY

(71) Applicant: Honda Motor Co., Ltd., Tokyo (JP)

(72) Inventors: Yuya Akaba, Tokyo (JP); Shungo Chino, Tokyo (JP); Toshihiro Yamaguchi, Tokyo (JP); Takafumi Takayama, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 398 days.

(21) Appl. No.: 18/184,669

(22) Filed: Mar. 16, 2023

(65) Prior Publication Data

US 2023/0312012 A1 Oct. 5, 2023

(30) Foreign Application Priority Data

Mar. 31, 2022 (JP) ................................. 2022-058955

(51) Int. Cl.
B62D 25/20 (2006.01)
B62D 21/15 (2006.01)
(Continued)

(52) U.S. Cl.
CPC ........ B62D 25/2036 (2013.01); B62D 21/157 (2013.01); B62D 25/08 (2013.01);
(Continued)

(58) Field of Classification Search
CPC .... B62D 21/152; B62D 21/157; B62D 25/08; B62D 25/088; B62D 25/20; B62D 25/2027; B62D 25/2036
(Continued)

(56) References Cited

U.S. PATENT DOCUMENTS

2003/0071490 A1* 4/2003 Nishikawa ......... B62D 25/2027
296/203.04
2004/0195865 A1* 10/2004 Tomita ................. B62D 21/157
296/203.04
(Continued)

FOREIGN PATENT DOCUMENTS

CN 110304155 10/2019
CN 110901772 3/2020
(Continued)

OTHER PUBLICATIONS

Translation for JP 2014051116.*
"First Office Action of China Counterpart Application", issued on Sep. 27, 2025, with English translation thereof, pp. 1-11.

*Primary Examiner* — Amy R Weisberg
*Assistant Examiner* — Denise Lynne Esquivel
(74) *Attorney, Agent, or Firm* — JCIPRNET

(57) ABSTRACT

A rear part structure of a vehicle body includes: a rear side frame, extending in a front-rear direction of the vehicle body on an outside of a floor of a rear part of the vehicle body in a vehicle width direction; and a wheelhouse, arranged outside the rear side frame in the vehicle width direction. At least a portion of an outer wall of the rear side frame in the vehicle width direction is formed by the wheelhouse. A partition member provided within a section of the rear side frame has one end in the vehicle width direction joined to the outer wall formed by the wheelhouse, extends from the outer wall to a front side of the vehicle body and inward in the vehicle width direction, and has the other end in the vehicle width direction joined to an inner wall of the rear side frame.

10 Claims, 6 Drawing Sheets

(51) Int. Cl.
| | | |
|---|---|---|
| B62D 25/08 | (2006.01) |
| B62D 25/16 | (2006.01) |
| B62D 25/18 | (2006.01) |

(52) U.S. Cl.
CPC ........ B62D 25/2027 (2013.01); *B62D 25/163* (2013.01); *B62D 25/18* (2013.01)

(58) Field of Classification Search
USPC .... 296/187.11, 187.12, 193.08, 198, 203.03, 296/203.04
See application file for complete search history.

(56) References Cited

U.S. PATENT DOCUMENTS

| | | | |
|---|---|---|---|
| 2007/0158977 A1* | 7/2007 | Yasukouchi | ......... B62D 25/087 |
| | | | 296/203.04 |
| 2019/0291787 A1 | 9/2019 | Tsukamoto et al. | |
| 2020/0086922 A1 | 3/2020 | Yamada et al. | |
| 2020/0269922 A1 | 8/2020 | Kiyoshita et al. | |
| 2022/0258808 A1* | 8/2022 | Chino | ................... B62D 25/08 |

FOREIGN PATENT DOCUMENTS

| | | | |
|---|---|---|---|
| CN | 111619678 | | 9/2020 |
| JP | 2014051115 | | 3/2014 |
| JP | 2014051116 A | * | 3/2014 |

* cited by examiner

REAR PART STRUCTURE OF VEHICLE BODY

CROSS-REFERENCE TO RELATED APPLICATIONS

This application claims the priority benefit of Japan Application No. 2022-058955, filed on Mar. 31, 2022. The entirety of the above-mentioned patent application is hereby incorporated by reference herein and made a part of this specification.

BACKGROUND

Technical Field

The disclosure relates to a rear part structure of a vehicle body.

Related Art

As a rear part structure of a vehicle body, for example, Patent Document 1 has disclosed the following configuration. By provision of a load transmission member in a position behind a rear door opening and in front of a wheelhouse, a load due to impact at the time of a vehicle collision that is input to a rear door may be transmitted to a vehicle body side by the load transmission member, and the rear door may be prevented from entering the interior of the vehicle due to displacement.

[Patent Document 1] Japanese Patent Laid-open No. 2014-51115

However, in recent years, there has been an increasing number of vehicles equipped with large batteries, and the weight of the vehicles has been increased by the mounting of the batteries. Accordingly, a load input to a vehicle body due to a collision (so-called side collision) from a side of the vehicle has also been increased. In the case where the load input to the vehicle body at the time of a side collision of the vehicle is excessively large, in the conventional structure described in Patent Document 1, because of an increase in the load input to a rear side frame, the rear side frame may be deformed and its entry into the interior of the vehicle may not be able to be completely prevented.

SUMMARY

A rear part structure of a vehicle body according to the disclosure includes: a rear side frame, extending in a front-rear direction of the vehicle body on an outside of a floor of a rear part of the vehicle body in a vehicle width direction; a wheelhouse, arranged outside the rear side frame in the vehicle width direction; and a partition member, provided within a section of the rear side frame. At least a portion of an outer wall of the rear side frame in the vehicle width direction is formed by the wheelhouse. The partition member has one end in the vehicle width direction joined to the outer wall formed by the wheelhouse, extends from the outer wall to a front side of the vehicle body and inward in the vehicle width direction, and has the other end in the vehicle width direction joined to an inner wall of the rear side frame.

DESCRIPTION OF THE EMBODIMENTS

Figure 1:
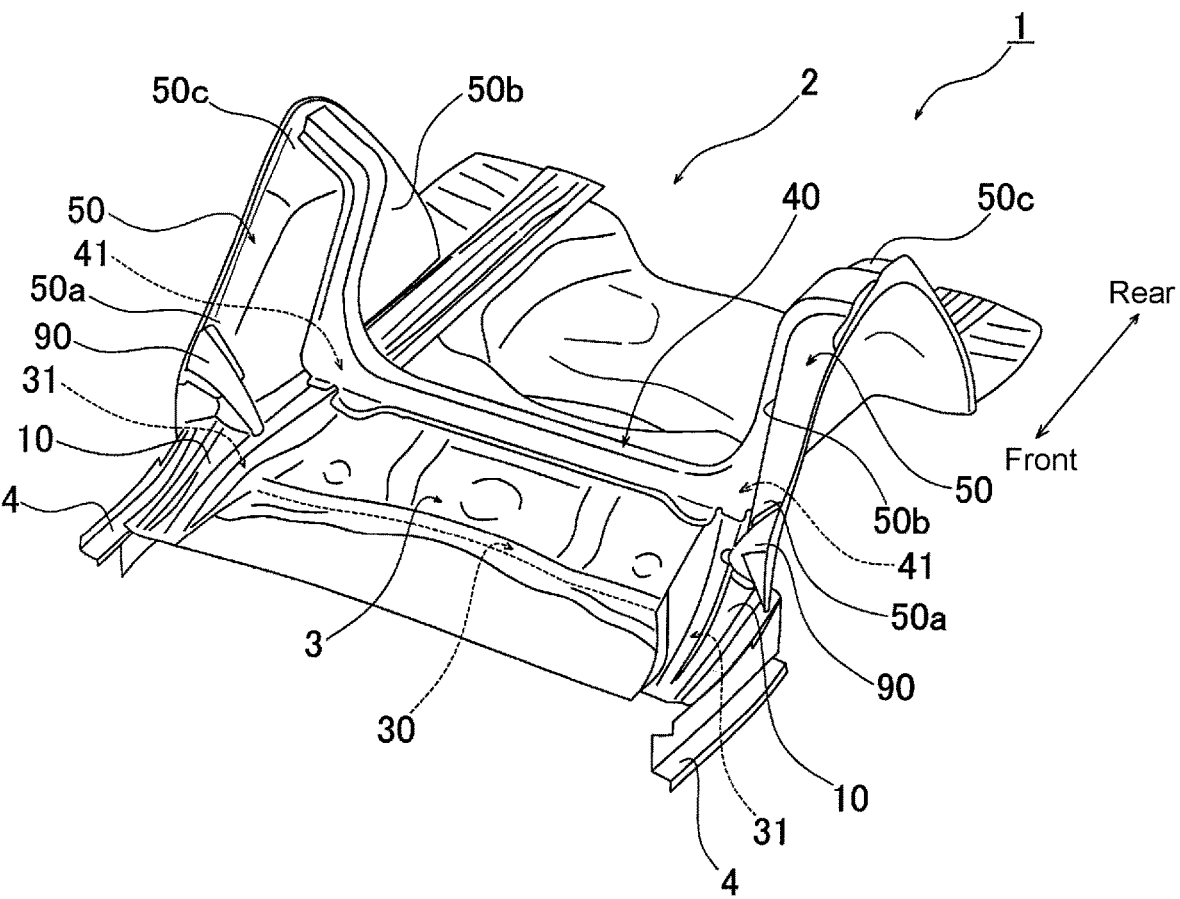
FIG. 1 is a schematic perspective view from above of a floor of a rear part of a vehicle body to which a rear part structure of a vehicle body according to an embodiment of the disclosure is applied.

In the disclosure, a rear part structure of a vehicle body is provided in which deformation of a rear part of the vehicle body at the time of a side collision can be effectively suppressed by effectively improving resistance of a rear side frame to a load input due to a vehicle collision by a simple configuration. Thereby, while the safety of transportation by vehicle is improved, deterioration of smoothness of transportation is suppressed.

A rear part structure of a vehicle body according to the disclosure includes: a rear side frame (10), extending in a front-rear direction of the vehicle body (1) on an outside of a floor (2) of a rear part of the vehicle body (1) in a vehicle width direction; and a wheelhouse (50), arranged outside the rear side frame (10) in the vehicle width direction. At least a portion of an outer wall (12) of the rear side frame (10) in the vehicle width direction is formed by the wheelhouse (50). The rear part structure of a vehicle body includes a partition member (80) provided within a section of the rear side frame (10). The partition member (80) has one end in the vehicle width direction joined to the outer wall (12) formed by the wheelhouse (50), extends from the outer wall (12) to a front side of the vehicle body (1) and inward in the vehicle width direction, and has the other end in the vehicle width direction joined to an inner wall (13) of the rear side frame (10).

According to the rear part structure of a vehicle body according to the disclosure, since the partition member extends from the outer wall of the rear side frame that forms a portion of the wheelhouse to the front side of the vehicle body and inward in the vehicle width direction, in the case where a load of a collision (side collision) to a side surface of a vehicle is applied to a tire, if the tire contacts the wheelhouse, a load input to the wheelhouse can be efficiently transmitted to the inner wall of the rear side frame. Accordingly, rigidity of the rear part of the vehicle body can be improved, and deformation (deformation inward in the vehicle width direction (toward the interior side)) of the rear part (floor) of the vehicle body at the time of a side collision can be relatively effectively suppressed.

In the disclosure described above, the rear part structure of a vehicle body may include: a cross member (30, 40), connected to the rear side frame (10) and extending inward in the vehicle width direction; and a wheelhouse gusset (90), in which a connection part (91) provided on an upper surface (15) of the rear side frame (10) and the wheelhouse (50) are connected. The partition member (80) may be provided in a position side by side with the connection part (91) in an up-down direction.

According to this configuration, since the partition member is provided in the position side by side in the up-down direction with the connection part that connects the wheelhouse gusset in the rear side frame, a load of a side collision input to the wheelhouse may be transmitted to the cross member via the partition member. Accordingly, the rigidity of the rear part of the vehicle body can further be improved, and deformation (deformation inward in the vehicle width direction (toward the interior side)) of the rear part (floor) of the vehicle body at the time of a side collision can be relatively effectively suppressed.

In the disclosure described above, the rear part structure of a vehicle body may include: an intermediate member (95), joined to an upper side of the partition member (80) within the section of the rear side frame (10). The intermediate member (95) and the wheelhouse gusset (90) may be arranged in positions side by side in the up-down direction.

According to this configuration, by providing the intermediate member joined to the upper side of the partition member, a load due to a side collision input to the wheelhouse can be relatively efficiently transmitted and distributed by the partition member. Accordingly, since the rigidity of the rear side frame can further be improved, deformation of the rear side frame can be relatively effectively suppressed.

In the disclosure described above, the wheelhouse (50) may be formed by a flange (52) that forms a rear door opening (53) of the vehicle body (1) and a bulge (51) that bulges inward in the vehicle width direction from the flange (52). The wheelhouse gusset (90) may be joined to the flange (52) and the bulge (51).

According to this configuration, since the wheelhouse gusset is joined to the flange and the bulge, a load input to the wheelhouse from a side of the vehicle body and a load input to the wheelhouse from a tire can both be transmitted to the partition member via the wheelhouse gusset. Accordingly, deformation of the wheelhouse and the rear side frame inward in the vehicle width direction (toward the interior side) can be relatively effectively suppressed.

In the disclosure described above, the wheelhouse gusset (90) and the intermediate member (95) may be joined by welding via an upper member (15) that constitutes an upper wall of the rear side frame (10). The partition member (80) may be joined to the intermediate member (95) by adhesion with an adhesive.

According to this configuration, since the wheelhouse gusset and the intermediate member are joined by welding via the upper member, and the partition member is joined to the intermediate member by adhesion with an adhesive, a load applied to the wheelhouse at the time of a collision (rear collision) from the rear side of the vehicle body or a side collision can be efficiently transmitted to the rear side frame via the intermediate member.

In the disclosure described above, the intermediate member (95) may have a section formed in an upwardly open recess shape. The partition member (80) may be joined to a lower surface of the intermediate member (95).

According to this configuration, since the sectional shape of the intermediate member is an upwardly open recess shape (so-called hat-like sectional shape), and the partition member is joined to the lower surface of the intermediate member, the partition member can be joined to the intermediate member even if the partition member is arranged at an angle. Hence, since an arrangement angle of the partition member and the intermediate member can be set according to a load transmission path, a load can be relatively reliably transmitted by the partition member and the intermediate member.

In the disclosure described above, the cross member (30) may be connected to a position on a front side of the partition member (80) in the rear side frame (10). An end on the rear side frame (10) side of the cross member (30) may extend toward the partition member (80).

According to this configuration, since the end on the rear side frame side of the cross member extends toward the partition member, a load input to the partition member can be smoothly transmitted to the cross member, and the rigidity of the rear side frame can be improved.

In the disclosure described above, the rear part structure of a vehicle body may include: a reinforcing member (60), provided in a position on a front side of the partition member (80) within the section of the rear side frame (10). An inner end of the reinforcing member (60) in the vehicle width direction may be joined to the partition member (80), and an upper end of the reinforcing member (60) may be joined to the wheelhouse gusset (90) via the upper member (15) that constitutes the upper wall of the rear side frame (10).

According to this configuration, since the reinforcing member is provided in the position on the front side of the partition member, and the reinforcing member is joined to the wheelhouse gusset and the partition member, a load input from the wheelhouse can be transmitted via the reinforcing member, and the input load can be distributed. Accordingly, the rigidity of the rear side frame can be improved, and deformation of the rear side frame can be suppressed.

The above numerals in parentheses indicate reference numerals in the drawings of corresponding components in the embodiments described later for reference.

According to a rear part structure of a vehicle body according to the disclosure, a rear part structure of a vehicle body is provided in which deformation of a rear part of the vehicle body at the time of a side collision can be effectively suppressed by effectively improving resistance of a rear side frame to a load input due to a vehicle collision by a simple configuration. Thereby, while the safety of transportation by vehicle is improved, deterioration of smoothness of transportation can be suppressed.

An embodiment of the disclosure will be described below in detail with reference to the accompanying drawings. In the following description, the term "front" or "rear" as mentioned refers to a front side being a forward direction or a rear side being a rearward direction of a vehicle body (vehicle) described later. The terms "left" and "right" as mentioned respectively refer to the left and right in a vehicle width direction when the vehicle body (vehicle) is facing forward (front side). The terms "up" and "down" as mentioned refer to an up-down direction (vertical up-down direction) of the vehicle body (vehicle).

Figure 2:
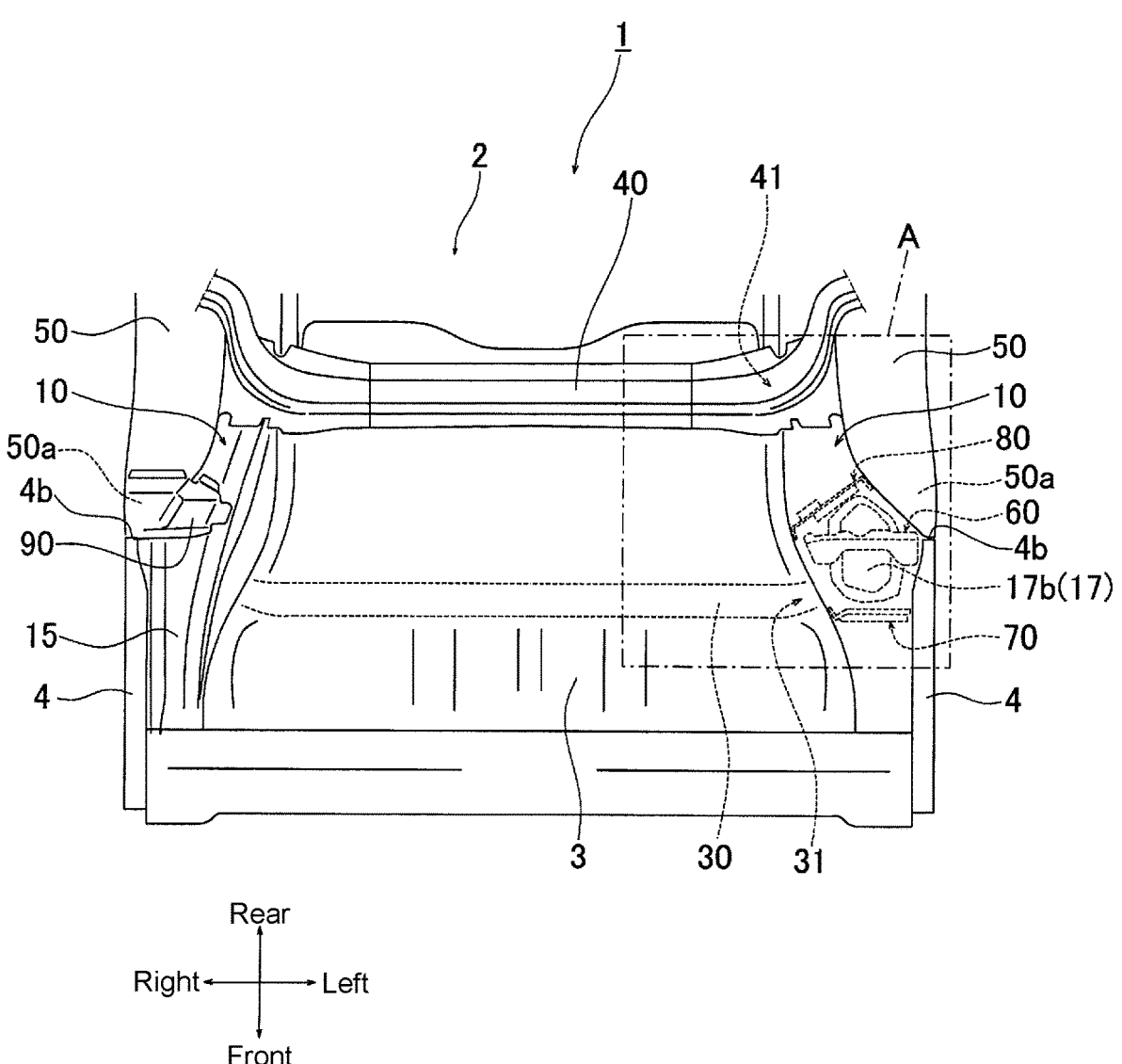
FIG. 2 is a schematic plan view showing a floor of a rear part of a vehicle body.

FIG. 1 and FIG. 2 illustrate a floor of a rear part of a vehicle body to which a rear part structure of a vehicle body according to an embodiment of the disclosure is applied, FIG. 1 is a schematic perspective view from above of the floor, and FIG. 2 is a schematic plan view showing the floor. As shown in these drawings, a vehicle body 1 of the present embodiment includes: a floor 2, provided in a rear part of the vehicle body 1; a pair of rear side frames 10, 10, extending in a front-rear direction of the vehicle body 1 on an outside of the floor 2 in a vehicle width direction; a front cross member 30, connected between the pair of rear side frames 10, 10 and extending inward in the vehicle width direction; a rear cross member 40, connected between the pair of rear side frames 10, 10 in a position on the rear side of the front cross member 30 and extending inward in the vehicle width direction; and a rear floor panel 3, constituting a bottom surface of the floor 2 between the pair of rear side frames 10, 10.

Figure 3:
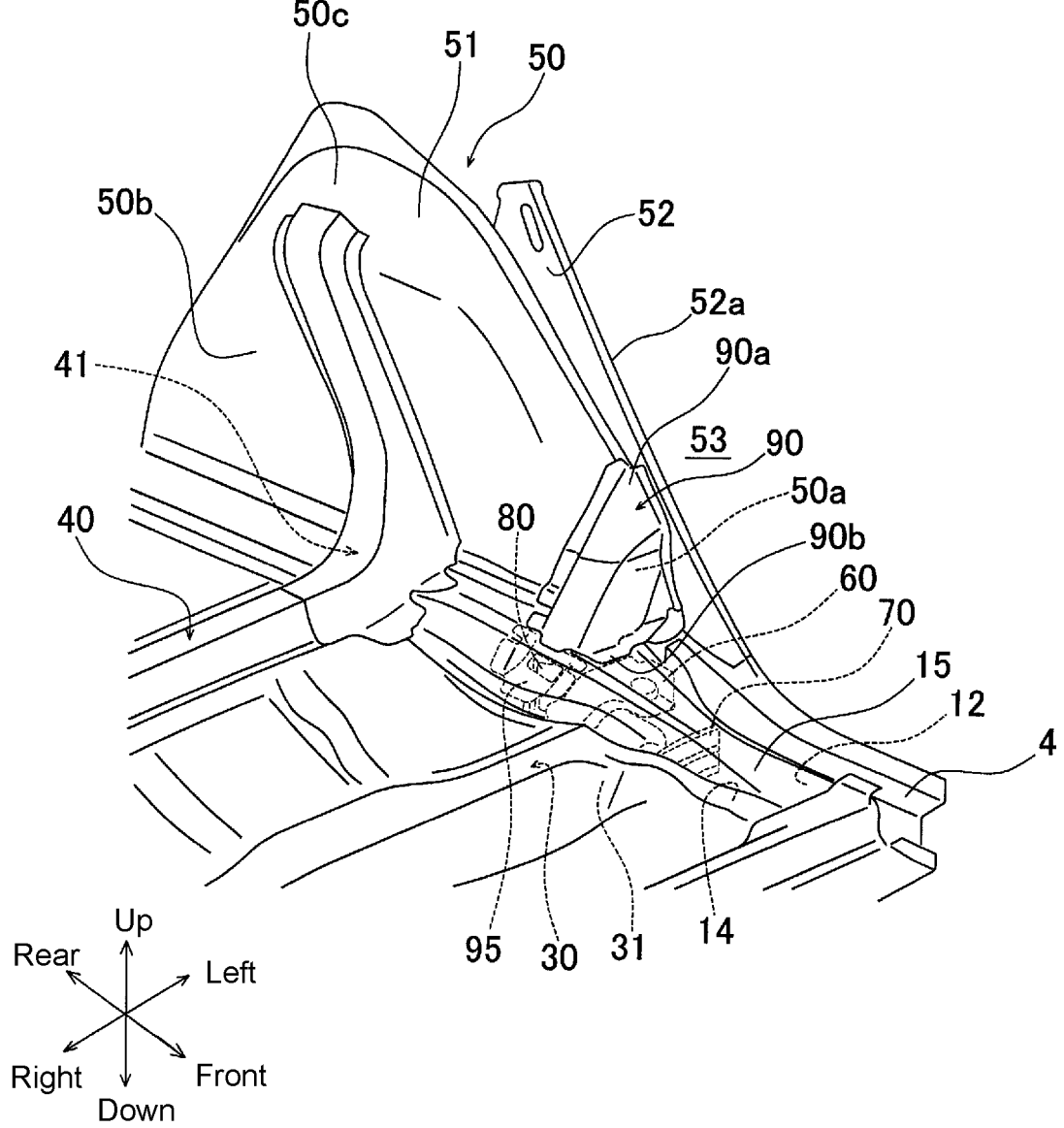
FIG. 3 is a perspective view showing a rear wheelhouse and a rear side frame.

Rear wheelhouses 50, 50 housing rear wheels (rear tires) (not shown) are respectively provided outside the pair of rear side frames 10, 10 in the vehicle width direction. FIG. 3 is a perspective view (perspective view from the front and inside in the vehicle width direction) showing a rear wheelhouse and a rear side frame. The rear wheelhouse 50 includes: a bulge 51, having an outer shape of a curved surface covering an outer shape of the rear tire, and bulging inward in the vehicle width direction; and a flange 52 of a plate shape, having a surface extending in the up-down direction outside the bulge 51. An upper end side 52a of the flange 52 constitutes a lower end side of a rear door opening 53 provided on a side of the vehicle body 1, and is inclined along a front side portion of the bulge 51 so as to gradually decrease in height from the rear toward the front.

In a front connection part (first connection part) 31 provided in a position on the front side of a front end 50a of the rear wheelhouse 50 in the rear side frame 10, the front cross member 30 is connected to a side surface (inner surface) of an inner wall 13 of the rear side frame 10, and connects the left and right rear side frames 10, 10 in the vehicle width direction. In a rear connection part (second connection part) 41 provided in a position inside the rear wheelhouse 50 in the rear side frame 10, the rear cross member 40 is connected to a side surface (inner surface) of the inner wall 13 of the rear side frame 10, extends upward from the rear connection part 41 along an inner surface 50b (inner wall of the bulge 51) of the rear wheelhouse 50, and has both ends respectively reaching upper ends 50c, 50c of the rear wheelhouses 50, 50. Accordingly, the rear cross member 40 connects the left and right rear side frames 10, 10 together, and also connects the left and right rear wheelhouses 50, 50 together. The rear side frame 10 and the rear wheelhouse 50 adjacent in the vehicle width direction are also connected by the rear cross member 40. The front connection part 31 is located on the front side of the rear connection part 41 in the front-rear direction of the vehicle body 1.

Figure 4:
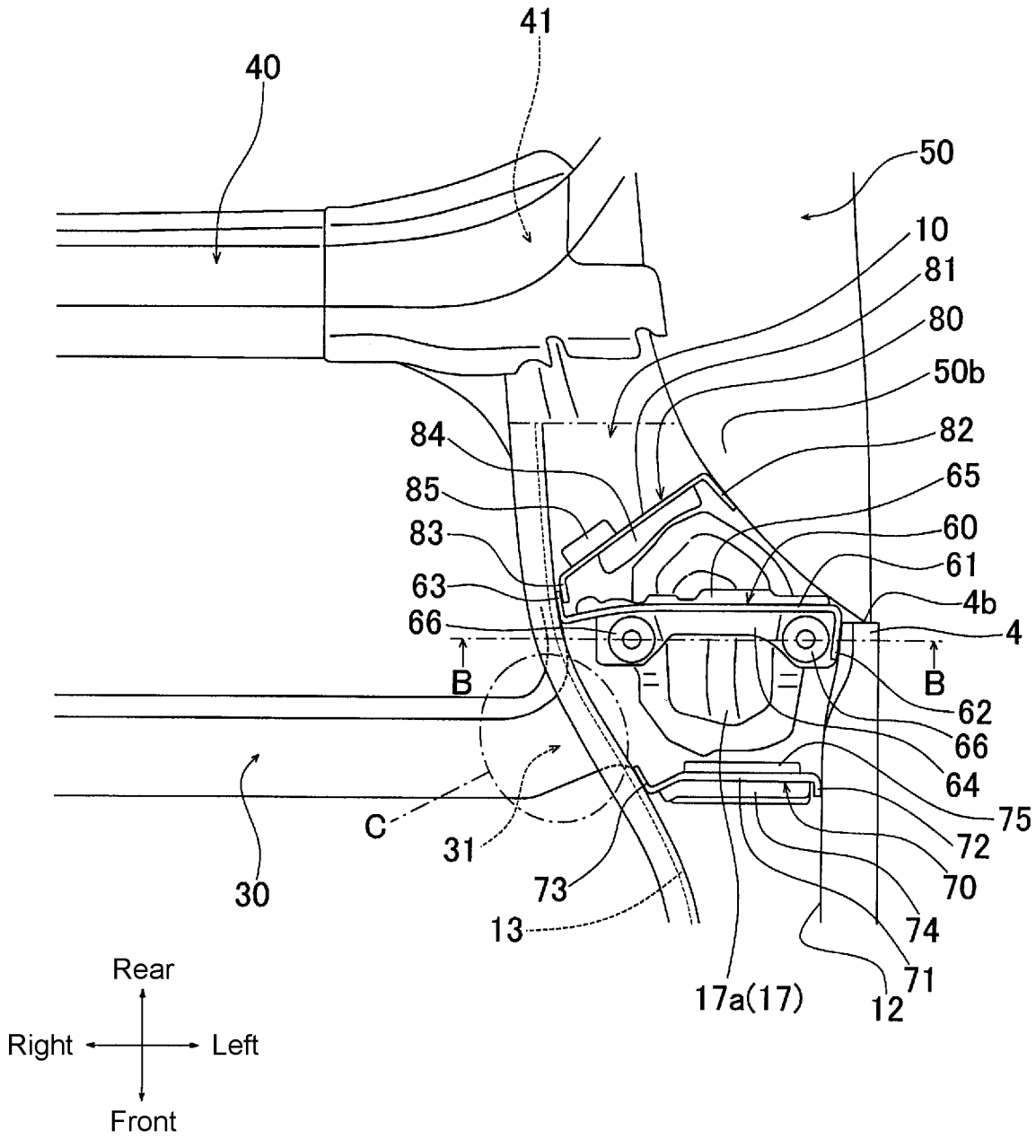
FIG. 4 is a plan view showing a rear side frame and a portion of its surroundings, and is a partially enlarged view of a portion A of FIG. 2.
Figure 5:
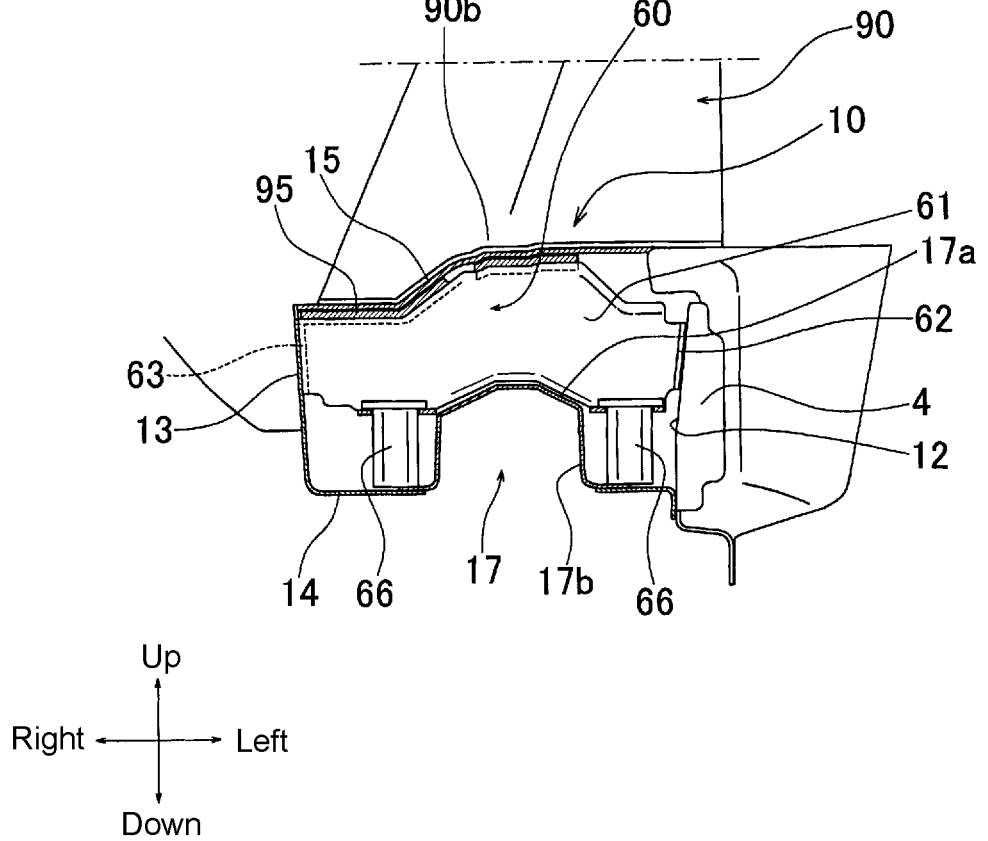
FIG. 5 illustrates a section of a rear side frame, and illustrates a section taken along line B-B of FIG. 4.
Figure 6:
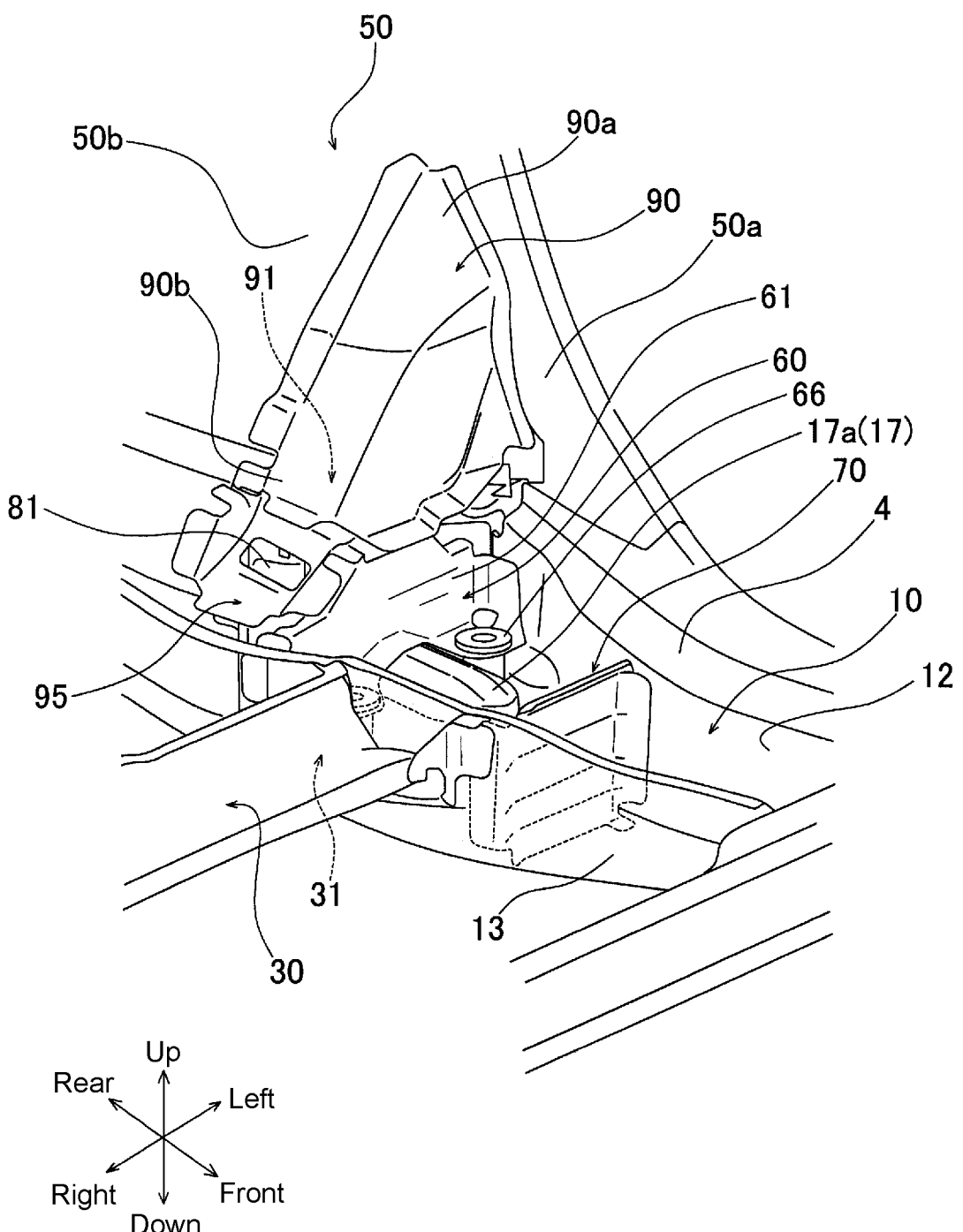
FIG. 6 is a perspective view showing the inside of a rear side frame and a front end of a rear wheelhouse.

FIG. 4 is a plan view showing a rear side frame and a portion of its surroundings, and is a partially enlarged view of a portion A of FIG. 2. FIG. 5 illustrates a section of a rear side frame, and illustrates a section taken along line B-B of FIG. 4. FIG. 6 is a perspective view showing the inside of a rear side frame and a front end of a rear wheelhouse.

Since a pair of left and right rear side frames 10, 10 and a pair of left and right rear wheelhouses 50, 50 have symmetrical shapes and configurations, in the following description, the rear side frame 10 and the rear wheelhouse 50 on one side will be described. In each of the above drawings, some members may be omitted for convenience of description. In particular, in FIG. 4, illustration of the rear floor panel 3 and an upper wall (upper member) 15 of the rear side frame 10 and a wheelhouse gusset 90 that are to be described later is omitted; in FIG. 6, illustration of the rear floor panel 3 and the upper wall 15 is omitted.

As shown in FIG. 3 to FIG. 5, the rear side frame 10 includes: an outer wall 12, constituting an outer wall in the vehicle width direction; an inner wall 13, constituting an inner wall in the vehicle width direction; a bottom wall 14, constituting a bottom part (bottom surface); and the upper wall (upper member) 15, constituting an upper part (upper surface). A section of the rear side frame 10 in a longitudinal direction as viewed in the front-rear direction is configured as a closed section of a substantially rectangular shape (substantially square shape). The outer wall 12 of the rear side frame 10 located on the rear side of the front end 50a of the rear wheelhouse 50 is composed of a curved part being the inner surface 50b (inner wall of the bulge 51) of the rear wheelhouse 50. The outer wall 12 of the rear side frame 10 located on the front side of the front end 50a of the rear wheelhouse 50 is composed of a side sill 4. The side sill 4 is an elongated member extending in the front-rear direction on both sides of the vehicle body 1 in front of the rear wheelhouse 50, and a rear end 4b of the side sill 4 is arranged in a position facing the front end 50a of the rear wheelhouse 50. Accordingly, the rear end 4b of the side sill 4 and its vicinity extend in the front-rear direction outside the rear side frame 10.

As shown in FIG. 4, while the outer wall 12 of the rear side frame 10 on the front side of the front end 50a of the rear wheelhouse 50 (rear end 4b of the side sill 4) extends substantially linearly along the front-rear direction as a portion of the side sill 4, the outer wall 12 of the rear side frame 10 on the rear side of the front end 50a of the rear wheelhouse 50 is gradually inclined inward in the vehicle width direction as going rearward along the inner surface 50b of the rear wheelhouse 50. On the other hand, the inner wall 13 of the rear side frame 10 is gradually inclined inward in the vehicle width direction from the front side toward the rear side from a position on the front side of the front connection part 31 to which the front cross member 30 is connected to the rear connection part 41 to which the rear cross member 40 is connected. According to the above, the rear cross member 40 is formed so that a dimension (width dimension of section) in the vehicle width direction gradually increases from the front side toward the rear side from the front connection part 31 to the rear connection part 41.

As shown in FIG. 4 and FIG. 5, the rear side frame 10 is provided with an arm attachment part 17 for attaching a trailing arm (not shown) being a component of a rear suspension. The arm attachment part 17 has a convex part 17a provided on the bottom wall (bottom surface) 14 of the rear side frame 10 and bulging (protruding) upward, and a recess 17b recessed upward is formed on a lower surface side (lower surface of the rear side frame 10) of the arm attachment part 17. A component of the trailing arm is connected into the recess 17b. Accordingly, the arm attachment part 17 is formed in the shape of a protrusion that becomes convex (protrudes) upward within a section of the rear side frame 10. The arm attachment part 17 is arranged in a position side by side with the front end 50a of the rear wheelhouse 50 and the rear end 4b of the side sill 4 in the vehicle width direction in the rear side frame 10, and is arranged in a position side by side with the front connection part 31 that connects the front cross member 30.

A reinforcing member 60 that reinforces the arm attachment part 17 is provided within the section of the rear side frame 10. The reinforcing member 60 is a plate-like member made of metal and extending in the vehicle width direction within the section of the rear side frame 10, and includes: a main body 61 of a substantially flat plate shape, extending from the outer wall 12 to the inner wall 13 of the rear side frame 10 in the vehicle width direction; and joining pieces 62 to 65 of a tongue shape, respectively connected to left and right end sides and lower and upper end sides of the main body 61. As shown in FIG. 5, the reinforcing member 60 is arranged in a position right above the arm attachment part 17 within the section of the rear side frame 10 and is arranged across the arm attachment part 17 in the vehicle width direction (left-right direction). The lower end side of the main body 61 of the reinforcing member 60 abuts against an upper surface of the arm attachment part 17 (convex part 17a).

The joining piece 63 on the inside of the reinforcing member 60 is joined by welding to the inner wall 13 of the rear side frame 10 and a joining piece 83 on the inside of a rear partition member 80 described later. The joining piece 62 on the outside of the reinforcing member 60 is joined by welding to an inner surface of the side sill 4 being the outer wall 12 of the rear side frame 10. The joining piece 65 on the upper side of the reinforcing member 60 is joined by adhesion with an adhesive to an intermediate member 95 described later and the upper wall (upper member) 15 of the rear side frame 10. On the other hand, the joining piece 64 on the lower side of the reinforcing member 60 is connected to the bottom wall 14 of the rear side frame 10 via a collar member 66 on each of both sides (left and right sides) of the arm attachment part 17 in the vehicle width direction. The collar member 66 is an elongated tubular member whose longitudinal direction extends in the up-down direction. An upper end of the collar member 66 is joined by welding to the joining piece 64 on the lower side of the reinforcing member 60, and a lower end of the collar member 66 is joined by welding to the bottom wall 14 of the rear side frame 10. The welding between the upper end of the collar member 66 and the joining piece 64 of the reinforcing member 60 is desirably projection welding.

In this way, the reinforcing member 60 provided within the section of the rear side frame 10 has an outer end in the vehicle width direction joined (welded) to the side sill 4 and has upper end joined (by adhesion) to the upper wall (upper member) 15 of the rear side frame 10.

The reinforcing member 60 is arranged in a position between the front connection part 31 to which the front cross member 30 is connected and the rear connection part 41 to which the rear cross member 40 is connected in the front-rear direction of the rear side frame 10.

A front partition member (first partition member) 70 is provided in a position on the front side of the reinforcing member 60 and the arm attachment part 17 within the section of the rear side frame 10. The front partition member 70 is a plate-like member made of metal and extending in the vehicle width direction within the section of the rear side frame 10, and includes: a main body 71 of a substantially flat plate shape, extending from the outer wall 12 to the inner wall 13 of the rear side frame 10 in the vehicle width direction; and joining pieces 72 to 75 of a tongue shape, respectively connected to left and right end sides and upper and lower end sides of the main body 71. The front partition member 70 is arranged in a position side by side with the front connection part 31 in the vehicle width direction within the section of the rear side frame 10.

The joining piece 73 on the inside of the front partition member 70 is joined by welding to the inner wall 13 of the rear side frame 10 and an end of the front cross member 30 at the front connection part 31. That is, the front partition member 70 is joined to the front cross member 30 via the inner wall 13 of the rear side frame 10. The joining piece 72 on the outside of the front partition member 70 is joined by welding to the inner surface of the side sill 4 being the outer wall 12 of the rear side frame 10. The joining piece 75 on the upper side of the front partition member 70 is joined by welding to the upper wall (upper member) 15 of the rear side frame 10, and the joining piece 74 on the lower side of the front partition member 70 is joined by welding to the bottom wall 14.

The rear partition member (second partition member) 80 is provided in a position on the rear side of the reinforcing member 60 and the arm attachment part 17 within the section of the rear side frame 10. The rear partition member 80 is a plate-like member made of metal and extending in the vehicle width direction within the section of the rear side frame 10, and extends inclined to the front side of the vehicle body and inward in the vehicle width direction. The rear partition member 80 includes: a main body 81 of a substantially flat plate shape, extending in an inclination direction from the inner surface 50b of the rear wheelhouse 50 (that is, the outer wall 12) to the inner wall 13 of the rear side frame 10 in the vehicle width direction; and joining pieces 82 to 85 of a tongue shape, respectively connected to left and right end sides and upper and lower end sides of the main body 81.

The joining piece 83 on the inside of the rear partition member 80 is joined by welding to the inner wall 13 of the rear side frame 10 and the joining piece 63 on the inside of the reinforcing member 60. That is, an inner end of the rear partition member 80 in the vehicle width direction is joined to the reinforcing member 60. The joining piece 82 on the outside of the rear partition member 80 is joined by welding to the inner surface 50b of the rear wheelhouse 50 being the outer wall 12 of the rear side frame 10. The joining piece 85 on the upper side of the rear partition member 80 is joined by adhesion with an adhesive to the intermediate member 95 described later, and the joining piece 84 on the lower side of the rear partition member 80 is joined by welding to the bottom wall 14.

As shown in FIG. 2 and FIG. 6, the wheelhouse gusset 90 is provided extending from the front end 50a of the rear wheelhouse 50 toward the upper wall 15 (upper surface) of the rear side frame 10 and connecting the front end 50a and the upper wall 15. The wheelhouse gusset 90 is a metal member provided extending inward and downward in the vehicle width direction from the front end 50a of the rear wheelhouse 50 so as to cover the upper wall 15 of the rear side frame 10. An upper end 90a of the wheelhouse gusset 90 is joined by welding to the front end 50a of the rear wheelhouse 50 (bulge 51) and the vicinity of the upper end side 52a in the flange 52. In FIG. 2, only one of the left and right wheelhouse gussets 90, 90 is shown.

The intermediate member 95 is provided to be joined (by adhesion) to the reinforcing member 60 and the upper side of the rear partition member 80 within the section of the rear side frame 10. A lower end 90b of the wheelhouse gusset 90 is joined to the intermediate member 95 via the upper wall (upper member) 15 of the rear side frame 10. Accordingly, the wheelhouse gusset 90 is joined to the rear partition member 80 and the reinforcing member 60 within the section of the rear side frame 10 via the intermediate member 95. Accordingly, the wheelhouse gusset 90 and the intermediate member 95 are joined by welding via the upper wall (upper member) 15 being a cover of the rear side frame 10.

The intermediate member 95 is a plate-like member made of metal, and has a section formed in an upwardly open recess shape (that is, a downwardly convex substantially U shape) as viewed in the vehicle width direction. The joining piece 85 on the upper side of the rear partition member 80 is joined to a lower surface of the sectional portion of the intermediate member 95. A joining portion between the lower surface of the intermediate member 95 and a joining piece of the rear partition member 80 is joined by adhesion with an adhesive.

The rear partition member 80, the intermediate member 95 and the reinforcing member 60 are arranged in positions right below an upper connection part (third connection part) 91 where the wheelhouse gusset 90 is connected to the rear side frame 10. The rear partition member 80, the intermediate member 95, and the reinforcing member 60 are provided in positions side by side with the lower end 90b of the wheelhouse gusset 90 and the upper connection part 91.

As shown in FIG. 4, the front connection part 31 in the rear side frame 10 to which the front cross member 30 is connected is arranged in a position on the front side of the rear partition member 80 in the rear side frame 10. In the front cross member 30 connected to the front connection part 31, an end on the rear side frame 10 side extends toward the rear side (rear partition member 80 side) of the vehicle body 1 (see portion C in FIG. 4). In other words, an end of the front cross member 30 is inclined so as to gradually become closer to the rear side outward in the vehicle width direction, and that portion is obliquely connected to the inner wall 13 of the rear side frame 10. Accordingly, the end on the rear side frame 10 side of the front cross member 30 extends toward the rear side of the vehicle body 1, that is, toward the rear partition member 80.

As described above, the rear part structure of a vehicle body of the present embodiment includes: the rear side frame 10, extending in the front-rear direction of the vehicle body 1 on the outside of the floor 2 of the rear part of the vehicle body 1 in the vehicle width direction; and the rear wheelhouse 50, arranged outside the rear side frame 10 in the vehicle width direction. A portion of the outer wall 12 of the rear side frame 10 is formed by the rear wheelhouse 50. The rear part structure of a vehicle body includes the rear partition member (partition member of the disclosure) 80 provided within the section of the rear side frame 10. The outer end of the rear partition member 80 in the vehicle width direction is joined to the inner surface 50b of the rear wheelhouse 50, the rear partition member 80 extends from the inner surface 50b of the rear wheelhouse 50 to the front side of the vehicle body 1 and inward in the vehicle width direction, and the inner end of the rear partition member 80 in the vehicle width direction is joined to the inner wall 13 of the rear side frame 10.

According to the rear part structure of a vehicle body of the present embodiment, since the rear partition member 80 extends from the inner surface 50b of the rear wheelhouse 50 to the front side of the vehicle body 1 and inward in the vehicle width direction, in the case where a load of a collision (side collision) to a side surface of a vehicle is applied to a tire, if the tire contacts the rear wheelhouse 50, a load input to the rear wheelhouse 50 can be efficiently transmitted to the inner wall 13 of the rear side frame 10. Accordingly, rigidity of the rear part of the vehicle body 1 can be improved, and deformation (deformation inward in the vehicle width direction (toward the interior side)) of the rear part (floor 2) of the vehicle body 1 at the time of a side collision can be relatively effectively suppressed.

In the present embodiment, the rear part structure of a vehicle body includes: the front cross member 30 and the rear cross member 40, connected to the rear side frame 10 and extending inward in the vehicle width direction; and the wheelhouse gusset 90, in which the upper connection part (third connection part: connection part of the disclosure) 91 provided on the upper wall (upper surface) 15 of the rear side frame 10 and the rear wheelhouse 50 are connected. The rear partition member 80 is provided in the position side by side with the upper connection part 91 in the up-down direction.

According to this configuration, since the rear partition member 80 is provided in the position side by side in the up-down direction with the upper connection part 91 that connects the wheelhouse gusset 90 in the rear side frame 10, a load of a side collision input to the rear wheelhouse 50 may be transmitted to the front cross member 30 and the rear cross member 40 via the rear partition member 80. Accordingly, the rigidity of the rear part of the vehicle body 1 can further be improved, and deformation (deformation inward in the vehicle width direction (toward the interior side)) of the rear part (floor 2) of the vehicle body 1 at the time of a side collision can be relatively effectively suppressed.

In the present embodiment, the rear part structure of a vehicle body includes: the intermediate member 95, joined to the upper side of the rear partition member 80 within the section of the rear side frame 10. The intermediate member 95 and the wheelhouse gusset 90 are arranged in the positions side by side in the up-down direction.

According to this configuration, by providing the intermediate member 95 joined to the upper side of the rear partition member 80, a load due to a side collision input to the rear wheelhouse 50 can be relatively efficiently transmitted and distributed by the rear partition member 80. Accordingly, since the rigidity of the rear side frame 10 can further be improved, deformation of the rear side frame 10 can be relatively effectively suppressed.

In the present embodiment, the rear wheelhouse 50 is formed by the flange 52 that forms the rear door opening 53 of the vehicle body 1 and the bulge 51 that bulges inward in the vehicle width direction from the flange 52. The wheelhouse gusset 90 is joined to the flange 52 and the bulge 51.

According to this configuration, since the wheelhouse gusset 90 is joined to the flange 52 and the bulge 51, a load input to the rear wheelhouse 50 from a side of the vehicle body 1 and a load input to the rear wheelhouse 50 from a tire can both be transmitted to the rear partition member 80 via the wheelhouse gusset 90. Accordingly, deformation of the rear wheelhouse 50 and the rear side frame 10 inward in the vehicle width direction (toward the interior side) can be relatively effectively suppressed.

In the present embodiment, the wheelhouse gusset 90 and the intermediate member 95 are joined by welding via the upper wall (upper member) 15 of the rear side frame 10. The rear partition member 80 is joined to the intermediate member 95 by adhesion with an adhesive.

According to this configuration, since the wheelhouse gusset 90 and the intermediate member 95 are joined by welding via the upper wall (upper member) 15, and the rear partition member 80 is joined to the intermediate member 95 by adhesion with an adhesive, a load applied to the rear wheelhouse 50 at the time of a collision (rear collision) from the rear side of the vehicle body 1 or a side collision can be efficiently transmitted to the rear side frame 10 via the intermediate member 95.

In the present embodiment, the intermediate member 95 has a section formed in an upwardly open recess shape. The rear partition member 80 is joined to the lower surface of the intermediate member 95.

According to this configuration, since the sectional shape of the intermediate member 95 is an upwardly open recess shape (so-called hat-like sectional shape), and the rear partition member 80 is joined to the lower surface of the intermediate member 95, the rear partition member 80 can be joined to the intermediate member 95 even if the rear partition member 80 is arranged at an angle. Hence, since an arrangement angle of the rear partition member 80 and the intermediate member 95 can be set according to a load transmission path, a load can be relatively reliably transmitted by the rear partition member 80 and the intermediate member 95.

In the present embodiment, the front cross member 30 is connected to the position on the front side of the rear partition member 80 in the rear side frame 10. The end on the rear side frame 10 side of the front cross member 30 extends toward the rear partition member 80.

According to this configuration, since the end on the rear side frame 10 side of the front cross member 30 extends toward the rear partition member 80, a load input to the rear partition member 80 can be smoothly transmitted to the front cross member 30, and the rigidity of the rear side frame 10 can be improved.

In the present embodiment, the rear part structure of a vehicle body includes: the reinforcing member 60, provided in the position on the front side of the rear partition member 80 within the section of the rear side frame 10. The inner end of the reinforcing member 60 in the vehicle width direction is joined to the rear partition member 80, and the upper end of the reinforcing member 60 is joined to the wheelhouse gusset 90 via the upper wall (upper member) 15 of the rear side frame 10.

According to this configuration, since the reinforcing member 60 is provided in the position on the front side of the rear partition member 80, and the reinforcing member 60 is joined to the wheelhouse gusset 90 and the rear partition member 80, a load input from the rear wheelhouse 50 can be transmitted via the reinforcing member 60, and the input load can be distributed. Accordingly, the rigidity of the rear side frame 10 can be improved, and deformation of the rear side frame 10 can be suppressed.

Although an embodiment of the disclosure has been described above, the disclosure is not limited to the above embodiment, and various modifications are possible within the scope of technical ideas described in the claims, specification and drawings.

What is claimed is:

1. A rear part structure of a vehicle body, comprising:
a rear side frame, extending in a front-rear direction of the vehicle body on an outside of a floor of a rear part of the vehicle body in a vehicle width direction;
a wheelhouse, arranged outside the rear side frame in the vehicle width direction; and
a partition member, provided within a section of the rear side frame, wherein
at least a portion of an outer wall of the rear side frame in the vehicle width direction is formed by the wheelhouse; and
the partition member has one end in the vehicle width direction directly joined to the outer wall formed by the wheelhouse, extends from the outer wall to a front side of the vehicle body and inward in the vehicle width direction, and has the other end in the vehicle width direction joined to an inner wall of the rear side frame, wherein the other end is closer to the front side of the vehicle body than the one end.

2. The rear part structure of a vehicle body according to claim 1, further comprising:
a cross member, connected to the rear side frame and extending inward in the vehicle width direction; and
a wheelhouse gusset, in which a connection part provided on an upper surface of the rear side frame and the wheelhouse are connected, wherein
the partition member is provided in a position side by side with the connection part in an up-down direction.

3. The rear part structure of a vehicle body according to claim 2, further comprising:
an intermediate member, joined to an upper side of the partition member within the section of the rear side frame, wherein
the intermediate member and the wheelhouse gusset are arranged in positions side by side in an up-down direction.

4. The rear part structure of a vehicle body according to claim 3, wherein
the wheelhouse is formed by a flange that forms a rear door opening of the vehicle body and a bulge that bulges inward in the vehicle width direction from the flange; and
the wheelhouse gusset is joined to the flange and the bulge.

5. The rear part structure of a vehicle body according to claim 4, wherein
the wheelhouse gusset and the intermediate member are joined by welding via an upper member that constitutes an upper wall of the rear side frame; and
the partition member is joined to the intermediate member by adhesion with an adhesive.

6. The rear part structure of a vehicle body according to claim 5, wherein
the intermediate member has a section formed in an upwardly open recess shape; and
the partition member is joined to a lower surface of the intermediate member.

7. The rear part structure of a vehicle body according to claim 2, wherein
the cross member is connected to a position on a front side of the partition member in the rear side frame; and
an end on the rear side frame side of the cross member extends toward the partition member.

8. The rear part structure of a vehicle body according to claim 6, further comprising:
a reinforcing member, provided in a position on a front side of the partition member within the section of the rear side frame, wherein
an inner end of the reinforcing member in the vehicle width direction is joined to the partition member, and an upper end of the reinforcing member is joined to the wheelhouse gusset via the upper member that constitutes the upper wall of the rear side frame.

9. A rear part structure of a vehicle body, comprising:
a rear side frame, extending in a front-rear direction of the vehicle body on an outside of a floor of a rear part of the vehicle body in a vehicle width direction;
a wheelhouse, arranged outside the rear side frame in the vehicle width direction; and
a partition member, provided within a section of the rear side frame, wherein
at least a portion of an outer wall of the rear side frame in the vehicle width direction is formed by the wheelhouse, wherein
the partition member has one end in the vehicle width direction joined to the outer wall formed by the wheelhouse, extends from the outer wall to a front side of the vehicle body and inward in the vehicle width direction, and has the other end in the vehicle width direction joined to an inner wall of the rear side frame;
a wheelhouse gusset, in which a connection part provided on an upper surface of the rear side frame and the wheelhouse are connected; and
an intermediate member, joined to an upper side of the partition member by adhesion within the section of the rear side frame, wherein
the wheelhouse gusset and the intermediate member are joined via an upper member that constitutes an upper wall of the rear side frame.

10. A rear part structure of a vehicle body, comprising:
a rear side frame, extending in a front-rear direction of the vehicle body on an outside of a floor of a rear part of the vehicle body in a vehicle width direction;

a cross member, connected to the rear side frame and extending inward in the vehicle width direction;

a wheelhouse, arranged outside the rear side frame in the vehicle width direction; and a partition member, provided within a section of the rear side frame, wherein at least a portion of an outer wall of the rear side frame in the vehicle width direction is formed by the wheelhouse;

the partition member has one end in the vehicle width direction joined to the outer wall formed by the wheelhouse, extends from the outer wall to a front side of the vehicle body and inward in the vehicle width direction, and has the other end in the vehicle width direction joined to an inner wall of the rear side frame;

the cross member is connected to a position on a front side of the partition member in the rear side frame; and an end on the rear side frame side of the cross member extends toward the partition member.

\* \* \* \* \*